United States Patent [19]

Ramsay et al.

[11] 4,146,288
[45] Mar. 27, 1979

[54] BAYONET CONNECTOR COUPLING ARRANGEMENT

[75] Inventors: Melvin M. Ramsay, Harlow; John S. Leach, Stortford; Raymond Ellor, Alton; John D. Archer, Halifax, all of England

[73] Assignee: International Standard Electric Corporation, New York, N.Y.

[21] Appl. No.: 850,818

[22] Filed: Nov. 11, 1977

[51] Int. Cl.² .................... F16L 37/24; H01R 13/54
[52] U.S. Cl. .................................. 339/90 R; 285/2
[58] Field of Search ............ 339/90 R, 188 R, 188 C; 285/2, 304

[56] References Cited

U.S. PATENT DOCUMENTS 2,933,711 4/1960 Eaton ............................ 339/90 R
3,252,124 5/1966 Hansen ........................ 339/90 R X Primary Examiner—Roy Lake
Assistant Examiner—E. F. Desmond
Attorney, Agent, or Firm—William T. O'Neil

[57] ABSTRACT

A coupling arrangement for mating electrical or optical connector subassemblies in which opposing coupling members are secured by a bayonet arrangement about their outer perimeters. Resilient (spring) fingers on at least one coupling member engage bayonet key-ways about the opposite member outer surface. The key-way and finger interface at the locked position is along at least one chamfered surface to permit the resilient fingers to deflect radially outwardly and "ride out" of the locked position to allow connector separation in response to excessive cable tension.

4 Claims, 5 Drawing Figures

BAYONET CONNECTOR COUPLING ARRANGEMENT

BACKGROUND OF THE INVENTION

1. Field of the Invention

This invention relates generally to interlocking coupling devices and particularly to such devices for electrical or optical cables.

2. Description of the Prior Art

When electrical or optical cables are used in the field in applications in which they are subjected to substantial tensile loads, there is a risk that excessive tension will cause connector damage before the cable reaches the breaking point. Damage caused by such uncontrolled connector failure may require the replacement of both connector halves and the attached cables if these are integral. The manner in which the invention deals with this situation to avoid such damage will be evident from the description hereinafter.

SUMMARY

The general object of the invention may be said to have been the provision of structure for connector release in excess tension load situations.

According to the invention, there is provided a connector coupling arrangement, including first and second mating coupling members at least one of which is provided with flexible finger members extending towards the other member and having latch portions for engaging corresponding key-ways (grooves or indentations) on the other connector member outer perimeter, and in which said fingers and latch portions are adapted to release their grip on the sockets on the application of predetermined axial tensile load. This release occurs through flexing of the fingers radially outwardly to permit them to "climb out" of their engaging grooves and permit separation of the first and second coupling members and their associated connector subassemblies.

DESCRIPTION OF THE PREFERRED EMBODIMENT

Figure 1:
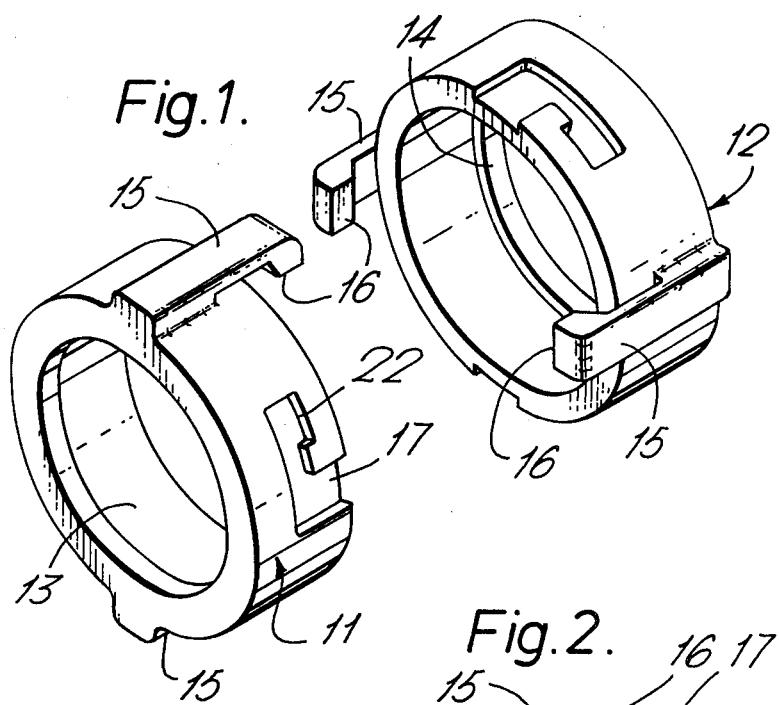
FIG. 1 shows a pair of typical coupling members according to the invention.
Figure 2:
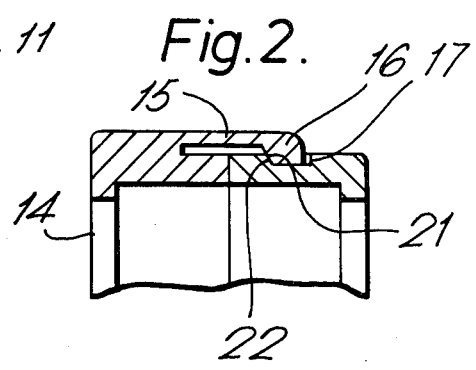
FIG. 2 is a partial cross-section of the mated coupling members of FIG. 1.

Referring to FIGS. 1 and 2, the coupling arrangement will be seen to comprise a pair of resilient metal or plastics rings 11 and 12 each adapted to fit over a corresponding one of a pair of mated connector members (bodies) of well known types. These rings have rotational freedom about their respective connector subassemblies much as is well known in prior art threaded coupling nuts, for example.

Each ring member has an axial bore 13 for receiving the respective connector member and an internal flange 14 which abuts the rearward shoulder of the connector member to hold the connector halves together when the assembly is mated. Latching of the coupling members is provided by longitudinally (axially) extending spring fingers 15 which, at their free ends, extending beyond the mating or interface surfaces of the coupling members, and have inwardly directed nose portions 16 for engaging and interlocking with bayonet key-ways 17 on the outer surfaces of the respective coupling members.

As shown in FIG. 2, engaging faces 21 and 22 of the nose portion 16 and key-ways, respectively, are chamfered so that excessive axial tensile stress tends to force the nose portion out of the key-ways to release the coupling. That is, the chamfer provides an inclined plane over which the chamfered finger face may "ride up", causing a radially outward finger deflection and sliding of the finger nose over the ring perimeter surface. The spring resilience of the finger members is selected such that they release from the key-ways when a predetermined axial tension is applied. Obviously, the chamfer angles are also subject to design considerations in the obtaining of a predetermined axial tension "break away" point.

The coupling members 11 and 12 may be formed from a resilient metal or from a known plastics material and, in view of the inherent symmetry of the arrangement, may advantageously be identical in construction. In some applications, however, (e.g. to prevent incorrect mating of connector members) where a plurality of connections are required in juxtaposition, couplings of different construction or with discrete keying may be employed.

Figure 3:
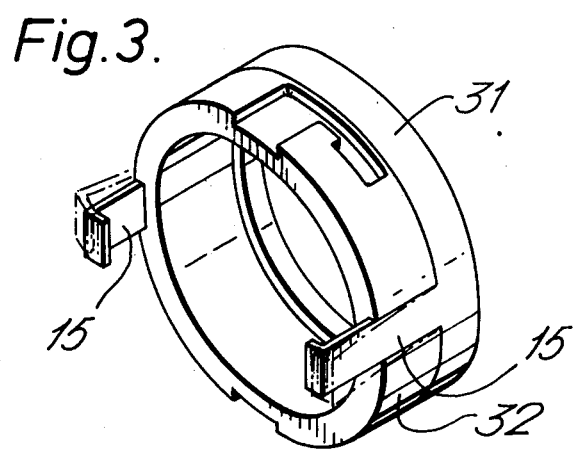
FIG. 3 shows an alternative spring-finger configuration in a coupling member otherwise according to FIG. 1.
Figure 4:
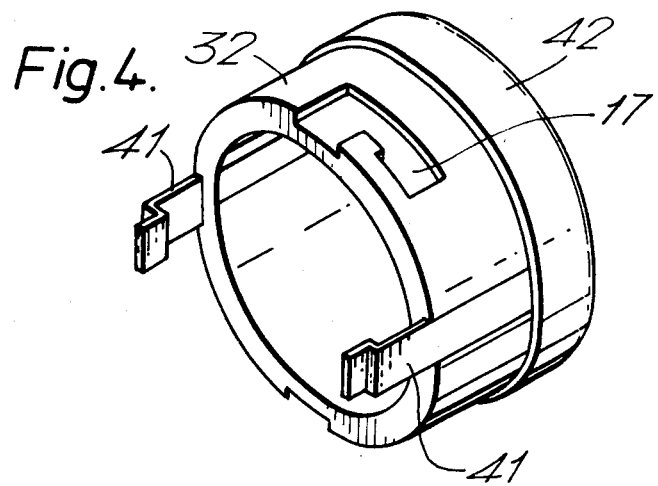
FIGS. 4 and 5 show an alternate configuration according to the invention.
Figure 5:
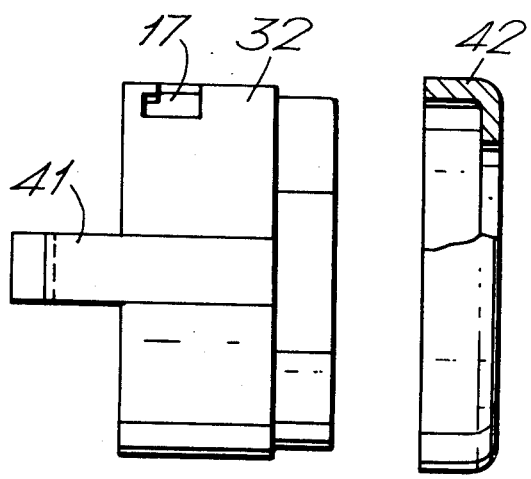

FIG. 3 shows an alternative construction of the spring fingers for the coupling members of FIG. 1. In this construction, the spring fingers 15 extend from a ring 31 of spring material (spring steel, for example) fitted to the rear of the coupling body 32. The fingers 15 engage bayonet key-ways on the mating coupling member as previously described in connection with FIG. 1.

Other modifications and variations will suggest themselves to those skilled in this art, and it is therefore not intended that the scope of the invention should be limited to the drawing and this description, these being intended to be typical and illustrative only.

What is claimed is:

1. Apparatus for securing a pair of mating connector bodies of one of the types including electrical and optical connector bodies comprising:

first and second substantially identical hollow cylindrical coupling members, one each to a corresponding one of a pair of mating connector bodies mated for effecting at least one electrical connection;

an internal radically inwardly formed annular ring in each of said coupling members for providing a shoulder to bear against an opposing shoulder on a corresponding connector body to constrain said connector bodies in the mated condition when said coupling members are mated, at least one of said coupling members being freely rotatable about its corresponding connector body;

bayonet type locking means for locking said coupling members together to secure said connector bodies in said mated condition, said locking means comprising at least two circumferentially oppositely located spring fingers affixed to the outside perimeter of each of said coupling members, said fingers extending axially beyond the interface surface of said first coupling member, said fingers each having a radially inwardly directed nose at its outer end;

means comprising a pair of generally L-shaped keyways circumferentially oppositely located in the outer surface of each of said coupling members, said key-ways being circumferentially symmetrically disposed between said spring fingers and having axially extending slot portions for receiving said noses of said fingers in sliding relationship as said coupling members are brought into mating position, said key-ways also each including a second slot portion continuing at generally right angles to said axially extending slot portion to form said L-shape, said finger noses being directed into said second slot portions in response to relative rotation of said coupling members;

and means comprising a chamfer on at least one of the engaging surfaces between said noses and the corresponding side walls of said second slot portions when said coupling members are in said mating position, said chamfer providing an inclined plane along which said noses can slide deflecting said fingers to permit decoupling of said connector bodies in response to a predetermined axial tensile force.

2. Apparatus according to claim 1 in which said noses and their corresponding second slot portion side walls are both chamfered to form an interface in a plane at an angle with respect to the plane of interface of said connector bodies.

3. Apparatus according to claim 1 in which said coupling members each have two of said spring fingers oppositely located about their outer surfaces and two of said key-ways, oppositely located symmetrically between said fingers on each of said coupling members, said first and second coupling members thereby being identical parts providing four 90° spaced points of spring finger versus key-way attachments.

4. Apparatus according to claim 2 in which said coupling members each have two of said spring fingers oppositely located about their outer surfaces and two of said key-ways, oppositely located symmetrically between said fingers on each of said coupling members, said first and second coupling members thereby being identical parts providing four 90° spaced points of spring finger versus key-way attachments.

* * * * *